US012790469B2

(12) United States Patent
Takagi et al.

(10) Patent No.: US 12,790,469 B2
(45) Date of Patent: Nov. 10, 2026

(54) RUBBER COMPOSITION

(71) Applicant: The Yokohama Rubber Co., LTD., Kanagawa (JP)

(72) Inventors: Ryosuke Takagi, Kanagawa (JP); Manabu Kato, Kanagawa (JP); Rie Nakajima, Kanagawa (JP); Misa Kondo, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 737 days.

(21) Appl. No.: 18/256,356

(22) PCT Filed: Dec. 2, 2021

(86) PCT No.: PCT/JP2021/044210

§ 371 (c)(1),
(2) Date: Jun. 7, 2023

(87) PCT Pub. No.: WO2022/130994

PCT Pub. Date: Jun. 23, 2022

(65) Prior Publication Data

US 2024/0018345 A1 Jan. 18, 2024

(30) Foreign Application Priority Data

Dec. 14, 2020 (JP) ................................ 2020-206414

(51) Int. Cl.
*C08L 9/06* (2006.01)
*B60C 1/00* (2006.01)
*C08L 7/00* (2006.01)

(52) U.S. Cl.
CPC .............. *C08L 9/06* (2013.01); *B60C 1/0016* (2013.01); *C08L 7/00* (2013.01); *C08L 2205/03* (2013.01); *C08L 2205/035* (2013.01)

(58) Field of Classification Search
CPC ................. C08L 9/06; C08L 9/00; C08L 7/00
See application file for complete search history.

(56) References Cited

FOREIGN PATENT DOCUMENTS

| | | | | |
|---|---|---|---|---|
| EP | 4 349 612 | A1 | | 4/2024 |
| JP | 2009-138157 | A | | 6/2009 |
| JP | 2012-007145 | A | | 1/2012 |
| JP | 2014189697 | A | * | 10/2014 |
| JP | 2019-104484 | A | | 6/2019 |
| JP | 2019-131795 | A | | 8/2019 |
| JP | 2020-105387 | A | | 7/2020 |
| JP | 2020-105394 | A | | 7/2020 |
| WO | 2013/161288 | A1 | | 10/2012 |

* cited by examiner

*Primary Examiner* — Peter A Salamon
(74) *Attorney, Agent, or Firm* — Thorpe North & Western

(57) ABSTRACT

This rubber composition contains from 1 to 150 parts by mass of a mixed resin in 100 parts by mass of a diene rubber, where the mixed resin contains from 1 to 99 mass % of a hydrogenated styrene resin and from 99 to 1 mass % of an aromatic modified terpene resin.

17 Claims, No Drawings

RUBBER COMPOSITION

TECHNICAL FIELD

The present technology relates to a rubber composition providing wet grip properties, low rolling resistance, and cut and chipping resistance in a compatible manner.

BACKGROUND ART

In recent years, a tire that is environmentally friendly is required to have excellent fuel economy performance but, simultaneously, it is important for the tire to ensure grip performance and durability that are equal to or better than those of known tires, as basic performances. However, the fuel economy performance and the grip performance are in conflict with each other and therefore it is generally considered that achieving both in a compatible manner has been difficult.

Japan Unexamined Patent Publication No. 2009-138157 A proposes improvement of wet grip properties and low rolling resistance by blending an aromatic modified terpene resin in a rubber composition constituting a tire. Furthermore, Japan Unexamined Patent Publication No. 2019-131795 A proposes improvement of wet grip properties and low rolling resistance by blending a hydrogenated styrene resin in a rubber composition. However, the technologies described in Japan Unexamined Patent Publication Nos. 2009-138157 A and 2019-131795 A have difficulties in improving cut and chipping resistance in addition to the wet grip properties and the low rolling resistance. That is, a rubber composition providing wet grip properties, low rolling resistance, and cut and chipping resistance in a compatible manner has not been developed.

SUMMARY

The present technology provides a rubber composition providing wet grip properties, low rolling resistance, and cut and chipping resistance in a compatible manner.

The rubber composition according to the present technology contains from 1 to 150 parts by mass of a mixed resin in 100 parts by mass of a diene rubber, where the mixed resin contains from 1 to 99 mass % of a hydrogenated styrene resin and from 99 to 1 mass % of an aromatic modified terpene resin.

According to the rubber composition of an embodiment of the present technology, wet grip properties, low rolling resistance, and cut and chipping resistance can be provided in a compatible manner by blending from 1 to 150 parts by mass of a mixed resin in 100 parts by mass of a diene rubber, where the mixed resin contains from 1 to 99 mass % of a hydrogenated styrene resin and from 99 to 1 mass % of an aromatic modified terpene resin. Furthermore, the hydrogenation percentage of the hydrogenated styrene resin is preferably from 40 to 90%, and the rubber composition can further contain from 5 to 300 parts by mass of an inorganic filler in 100 parts by mass of the diene rubber.

In a rubber composition for a studless tire or studded tire, the diene rubber contains a natural rubber and a butadiene rubber, the average glass transition temperature of the diene rubber is preferably from −100° C. to −80° C., and the rubber composition preferably contains from 10 to 90 parts by mass of silica.

In a rubber composition for a winter tire, the diene rubber contains a styrene-butadiene rubber and a butadiene rubber, the average glass transition temperature of the diene rubber is preferably from −100° C. to −50° C., and the rubber composition preferably contains from 90 to 180 parts by mass of silica.

In a rubber composition for an all-season tire, the diene rubber contains a styrene-butadiene rubber, the average glass transition temperature of the diene rubber is preferably from −80° C. to −20° C., and the rubber composition preferably contains from 10 to 90 parts by mass of silica.

In a rubber composition for a high-performance tire or racing tire, the diene rubber contains a styrene-butadiene rubber, the average glass transition temperature of the diene rubber is preferably higher than −50° C. and −20° C. or lower, and the rubber composition preferably contains from 90 to 180 parts by mass of silica.

In a rubber composition for a fuel efficient tire, the diene rubber contains a styrene-butadiene rubber, the average glass transition temperature of the diene rubber is preferably from −40° C. to −20° C., and the rubber composition preferably contains 10 parts by mass or more and less than 90 parts by mass of silica.

The rubber composition described above can suitably constitute a tread portion of a tire. A tire having a tread portion made of the rubber composition according to an embodiment of the present technology can provide wet grip properties, low rolling resistance, and cut and chipping resistance in a compatible manner.

DETAILED DESCRIPTION

The rubber composition contains a diene rubber that is typically used in a tire. Examples of the diene rubber include natural rubber, isoprene rubber, butadiene rubber, styrene-butadiene rubber, styrene isoprene rubber, isoprene butadiene rubber, ethylene-propylene-diene copolymer rubber, chloroprene rubber, and acrylonitrile butadiene rubber. These diene rubbers may be modified with one or more functional groups. The type of the functional group is not particularly limited, and examples thereof include an epoxy group, carboxy group, amino group, hydroxy group, alkoxy group, silyl group, alkoxysilyl group, amide group, oxysilyl group, silanol group, isocyanate group, isothiocyanate group, carbonyl group, and aldehyde group.

The natural rubber, butadiene rubber, and styrene-butadiene rubber are not particularly limited as long as the natural rubber, butadiene rubber, and styrene-butadiene rubber are those typically used for rubber compositions. Blending the natural rubber can ensure cut and chipping resistance of a tire. Furthermore, blending the butadiene rubber can ensure tire performance on ice and snow. Furthermore, blending the styrene-butadiene rubber can ensure wet grip properties of a tire.

The rubber composition can provide wet grip properties, low rolling resistance, and cut and chipping resistance in a compatible manner by blending from 1 to 150 parts by mass of a mixed resin in 100 parts by mass of the diene rubber. When the amount of the mixed resin is less than 1 part by mass, an effect of providing wet grip properties, low rolling resistance, and cut and chipping resistance in a compatible manner cannot be adequately achieved. When the amount of the mixed resin is more than 150 parts by mass, wear resistance and processability tend to decrease. The mixed resin is preferably blended in an amount of 3 to 100 parts by mass, and more preferably from 5 to parts by mass.

The mixed resin is a mixture of a hydrogenated styrene resin and an aromatic modified terpene resin. A mixed resin may be prepared by mixing the hydrogenated styrene resin and the aromatic modified terpene resin in advance, or by separately charging the hydrogenated styrene resin and the aromatic modified terpene resin and mixing them in a kneader or the like which is used for production of the rubber composition, or by charging the hydrogenated styrene resin and the aromatic modified terpene resin together with other raw materials and mixing. The hydrogenated styrene resin and the aromatic modified terpene resin each improve wet grip properties and low rolling resistance. However, effect of improving cut and chipping resistance cannot be achieved when either one of the hydrogenated styrene resin or the aromatic modified terpene resin is blended alone. However, surprisingly, combined use of the hydrogenated styrene resin and the aromatic modified terpene resin can provide the effect of improving cut and chipping resistance in addition to improvement of the wet grip properties and the low rolling resistance. In 100 mass % of the mixed resin, the hydrogenated styrene resin is in an amount of 1 to 99 mass %, and the aromatic modified terpene resin is in an amount of 99 to 1 mass %. Preferably the hydrogenated styrene resin is in an amount of 5 to 95 mass % and the aromatic modified terpene resin is in an amount of 95 to 5 mass %, and more preferably the hydrogenated styrene resin is in an amount of 10 to 90 mass % and the aromatic modified terpene resin is in an amount of 90 to 10 mass %.

The hydrogenated styrene resin is a resin obtained by subjecting a styrene resin containing a styrene monomer to hydrogenation. When the styrene resin is subjected to hydrogenation, an amount of aromatic rings derived from styrene is reduced, and thus dispersibility in the diene rubber is improved. In addition, crosslinking of the diene rubber is promoted, and the modulus of the rubber composition after vulcanization increases because crosslinking positions between rubber polymers are uniformly distributed. Furthermore, when the crosslinking of the rubber is distributed uniformly and tightly, excellent durability is also achieved.

The styrene resin that serves as the base of the hydrogenated styrene resin can be obtained by subjecting styrene to addition polymerization. The addition polymerization reaction can be performed in accordance with a known method and, for example, the addition polymerization can be performed by a method of performing solution polymerization by using a living anionic polymerization catalyst, a method using a cationic polymerization catalyst, or a method using a radical polymerization initiator.

The hydrogenated styrene resin is obtained by subjecting an aromatic ring in the styrene resin to hydrogenation. The method of hydrogenation is a known method without particular limitation. The hydrogenation percentage of the aromatic ring is not particularly limited and is from 0.1 to 100%, preferably from 1 to 95%, more preferably from 40 to 90%, and even more preferably from 50 to 80%. When the hydrogenation percentage of the aromatic ring is less than 0.1%, characteristics by the hydrogenation cannot be adequately exhibited. Note that the hydrogenation percentage of the aromatic ring (hydrogenation percentage) is a value calculated by the following equation based on a peak height of absorbance originated from styrene determined by infrared spectrophotometer (IR).

$$\text{Hydrogenation percentage (\%)}=\{(C-D)/C\}\times 100$$

C: Absorption peak height originated from aromatic ring before hydrogenation

D: Absorption peak height originated from aromatic ring after hydrogenation

Note that, one type of hydrogenated styrene resin may be used alone, or a combination of two or more types of hydrogenated styrene resins may be used.

The molecular weight of the hydrogenated styrene resin is a weight average molecular weight (Mw) determined by a gel permeation chromatography (GPC) method, calibrated with polystyrene, of 500 to 10000, preferably from 1000 to 7000, and more preferably from 1500 to 5000. When the weight average molecular weight is less than 500, durability of the rubber composition becomes poor. When the weight average molecular weight is more than 10000, effect of improving grip properties of the rubber composition may be poor.

The aromatic modified terpene resin is a copolymer of terpene and an aromatic compound. Examples of the terpene include α-pinene, β-pinene, dipentene, and limonene. Examples of the aromatic compound include styrene, α-methylstyrene, vinyl toluene, and indene. In the aromatic modified terpene resin, the content of the aromatic compound is preferably from 10 to 50 mass %, and more preferably from 12 to 45 mass %. Blending the diene rubber in the aromatic modified terpene resin improves dynamic visco-elasticity of the rubber composition, and improves wet grip properties and heat build-up.

The softening point of the aromatic modified terpene resin is not particularly limited and is preferably from 60° C. to 150° C., and more preferably from 80° C. to 130° C. When the softening point of the aromatic modified terpene resin is lower than 60° C., wet grip properties may be deteriorated. When the softening point of the aromatic modified terpene resin is higher than 150° C., low rolling resistance may be deteriorated. In the present specification, the softening point of the aromatic modified terpene resin is measured in accordance with JIS (Japanese Industrial Standard) K 6220-1 (ring and ball method).

The rubber composition may contain preferably from 5 to 300 parts by mass, and more preferably from 30 to 150 parts by mass, of inorganic fillers in 100 parts by mass of the diene rubber. Blending the inorganic fillers can ensure tire durability such as cut and chipping resistance and steering stability. Examples of the inorganic fillers include carbon black, silica, calcium carbonate, magnesium carbonate, talc, clay, mica, alumina, aluminum hydroxide, titanium oxide, and calcium sulfate. One type or a combination of two or more types of the inorganic fillers can be used.

The carbon black is not particularly limited as long as the carbon black is the one typically used for a rubber composition. The nitrogen adsorption specific surface area of the carbon black is preferably from 50 to 160 m 2/g, more preferably from 80 to 150 m 2/g, and even more preferably from 100 to 130 m 2/g. When the carbon black has the nitrogen adsorption specific surface area of 50 m 2/g or more, tire durability can be ensured. Furthermore, when the carbon black has the nitrogen adsorption specific surface area of 160 m 2/g or less, heat build-up can be made small, and thus low rolling resistance can be ensured. The nitrogen adsorption specific surface area of the carbon black can be determined in accordance with JIS K 6217-2.

In 100 parts by mass of the diene rubber, preferably from 5 to 100 parts by mass, and more preferably from 5 to 80 parts by mass, of the carbon black may be blended. Blending 5 parts by mass or more of the carbon black can ensure tire durability. Additionally, rigidity can be ensured, and heat build-up can be made small. When the carbon black is blended in 100 parts by mass or less, low rolling resistance can be ensured. A combination of two or more types of the carbon blacks may be used.

The rubber composition may contain silica and can make heat build-up smaller. Examples of the silica include wet silica (hydrous silicic acid), dry silica (silicic anhydride), calcium silicate, and aluminum silicate. One type of these can be used alone, or a combination of two or more types of these can be used. Furthermore, surface-treated silica, in which the surface of silica is surface-treated by a silane coupling agent, may be also used.

In the rubber composition, a silane coupling agent is preferably blended together with the silica, and excellent dispersibility of the silica can be achieved. As the silane coupling agent, a type of silane coupling agent that is typically blended together with silica can be used. The silane coupling agent is blended in an amount of preferably from 5 to 15 mass %, and more preferably from 8 to 12 mass %, of the silica amount.

The rubber composition may also contain various additives that are commonly used in a rubber composition within a range that does not impair the object of the present technology. Examples thereof include vulcanization or crosslinking agents, vulcanization accelerators, anti-aging agents, plasticizers, processing aids, liquid polymers, and thermosetting resins. These additives may be kneaded by any commonly known method to form a rubber composition, and can be used for vulcanization or crosslinking. Blended amounts of these additives may be any known amount, so long as the objects of the present technology are not hindered.

Rubber Composition for Studless Tire and Studded Tire

The rubber composition that is suitable for forming a tread portion of a studless tire or studded tire and that solves the problems of the present technology contains from 1 to 150 parts by mass of a mixed resin in 100 parts by mass of a diene rubber containing a natural rubber and a butadiene rubber, and the average glass transition temperature of the diene rubber is preferably from −100° C. to −80° C. Furthermore, in 100 parts by mass of the diene rubber, from 10 to 90 parts by mass of silica is preferably blended.

In 100 mass % of the diene rubber, preferably from 20 to 80 mass %, and more preferably from 30 to 70 mass %, of natural rubber is preferably blended. Blending the natural rubber in this range can ensure tire durability.

In 100 mass % of the diene rubber, preferably from 20 to 60 mass %, and more preferably from 30 to 50 mass %, of butadiene rubber is preferably blended. Blending the butadiene rubber in this range can ensure tire performance on ice. The rubber composition constituting the tread portion of a studless tire or studded tire may contain another diene rubber besides the natural rubber and the butadiene rubber.

The average glass transition temperature of the diene rubber is preferably from −100° C. to −80° C., and more preferably from −90° C. to −80° C. When the diene rubber has the average glass transition temperature in this range, tire performance on ice can be ensured while tire durability is ensured. The average glass transition temperature of the diene rubber in the present specification can be determined based on a glass transition temperature of each of the blended diene rubbers and a weighted average of each content thereof. For the glass transition temperature of the diene rubber, differential scanning calorimetry (DSC) is performed at a rate of temperature increase of to obtain a thermogram, and the temperature at the midpoint of the transition region is defined as the glass transition temperature.

The rubber composition suitable for a studless tire or studded tire preferably contains from 10 to 90 parts by mass, and more preferably from 20 to 80 parts by mass, of silica in 100 parts by mass of the diene rubber. Blending the silica in this range can ensure tire durability while wet grip performance is ensured.

Rubber Composition for Winter Tire

The rubber composition that is suitable for forming a tread portion of a winter tire and that solves the problems of the present technology contains from 1 to 150 parts by mass of a mixed resin in 100 parts by mass of a diene rubber containing a styrene-butadiene rubber and a butadiene rubber, and the average glass transition temperature of the diene rubber is preferably from −100° C. to −50° C. Furthermore, in 100 parts by mass of the diene rubber, from 90 to 180 parts by mass of silica is preferably blended.

In 100 mass % of the diene rubber, preferably from 30 to 80 mass %, and more preferably from 40 to 70 mass %, of the styrene-butadiene rubber is preferably blended. Blending the styrene-butadiene rubber in this range can ensure wet grip performance.

In 100 mass % of the diene rubber, preferably from 20 to 50 mass %, and more preferably from 25 to 45 mass %, of the butadiene rubber is blended. Blending the butadiene rubber in this range can ensure performance on snow. The rubber composition constituting the tread portion of a winter tire may contain another diene rubber such as butadiene rubber besides the styrene-butadiene rubber and the butadiene rubber.

The average glass transition temperature of the diene rubber is preferably from −100° C. to −50° C., and more preferably from −70° C. to −50° C. When the average glass transition temperature is in this range, performance on snow can be ensured while wet grip performance is ensured.

The rubber composition suitable for the winter tire preferably contains from 90 to 180 parts by mass, and more preferably from 95 to 150 parts by mass, of silica in 100 parts by mass of the diene rubber. Blending the silica in this range can ensure wet grip performance.

Rubber Composition for all-Season Tire

The rubber composition that is suitable for forming a tread portion of an all-season tire and that solves the problems of the present technology contains from 1 to 150 parts by mass of a mixed resin in 100 parts by mass of a diene rubber containing a styrene-butadiene rubber, and the average glass transition temperature of the diene rubber is preferably from −80° C. to −20° C. Furthermore, in 100 parts by mass of the diene rubber, from 10 to 90 parts by mass of silica is preferably blended.

In 100 mass % of the diene rubber, preferably from 30 to 80 mass %, and more preferably from 40 to 70 mass %, of the styrene-butadiene rubber is blended. Blending the styrene-butadiene rubber in this range can ensure wet grip performance. The rubber composition constituting the tread portion of an all-season tire may contain another diene rubber such as butadiene rubber besides the styrene-butadiene rubber.

The average glass transition temperature of the diene rubber is preferably from −80° C. to −20° C., more preferably from −80° C. to −40° C., and even more preferably from −70° C. to −50° C. When the average glass transition temperature is in this range, tire performance on snow can be ensured.

The rubber composition suitable for the all-season tire preferably contains from 10 to 90 parts by mass, and more preferably from 20 to 80 parts by mass, of silica in 100 parts by mass of the diene rubber. Blending the silica in this range can ensure tire durability while wet grip performance is ensured. Rubber composition for high-performance tire or racing tire The rubber composition that is suitable for forming a tread portion of a high-performance tire and a racing tire and that solves the problems of the present technology contains from 1 to 150 parts by mass of a mixed resin in 100 parts by mass of a diene rubber containing a styrene-butadiene rubber, and the average glass transition temperature of the diene rubber is preferably higher than −50° C. and −20° C. or lower. Furthermore, in 100 parts by mass of the diene rubber, from 90 to 180 parts by mass of silica is preferably blended.

In 100 mass % of the diene rubber, preferably from 50 to 100 mass %, and more preferably from 65 to 95 mass %, of the styrene-butadiene rubber is blended. Blending the styrene-butadiene rubber in this range can improve dry grip. The rubber composition constituting the tread portion of a high-performance tire and a racing tire may contain another diene rubber such as butadiene rubber besides the styrene-butadiene rubber.

The average glass transition temperature of the diene rubber is preferably higher than −50° C. and −20° C. or lower, and more preferably from −40° C. to −30° C. When the average glass transition temperature is in this range, dry grip performance can be ensured.

The rubber composition suitable for a high-performance tire and a racing tire preferably contains from 90 to 180 parts by mass, and more preferably from 95 to 150 parts by mass, of silica in 100 parts by mass of the diene rubber. Blending the silica in this range can ensure wet grip performance.

Rubber Composition for Fuel Efficient Tire

The rubber composition that is suitable for forming a tread portion of a fuel efficient tire having excellent fuel economy performance and that solves the problems of the present technology contains from 1 to 150 parts by mass of a mixed resin in 100 parts by mass of a diene rubber containing a styrene-butadiene rubber, and the average glass transition temperature of the diene rubber is preferably from −40° C. to −20° C. Furthermore, in 100 parts by mass of the diene rubber, 10 parts by mass or more and less than 90 parts by mass of silica is preferably blended.

In 100 mass % of the diene rubber, preferably from 40 to 100 mass %, and more preferably from 60 to 95 mass %, of the styrene-butadiene rubber is blended. Blending the styrene-butadiene rubber in this range can ensure wet grip performance. The rubber composition constituting the tread portion of a fuel efficient tire may contain another diene rubber such as butadiene rubber besides the styrene-butadiene rubber.

The average glass transition temperature of the diene rubber is preferably from −40° C. to −20° C., and more preferably from −40° C. to −30° C. When the average glass transition temperature is in this range, low rolling resistance can be ensured while wet grip performance is ensured.

The rubber composition suitable for the fuel efficient tire preferably contains 10 parts by mass or more and less than 90 parts by mass, and more preferably from 20 to 80 parts by mass, of silica in 100 parts by mass of the diene rubber. Blending the silica in this range can ensure low rolling resistance while wet grip performance is ensured.

The rubber composition described above is preferably a rubber composition for a tire tread and can suitably constitute a tread portion of a tire. A tire having a tread portion made of the rubber composition according to an embodiment of the present technology can provide wet grip properties, low rolling resistance, and cut and chipping resistance in a compatible manner. Note that the tire may be a pneumatic tire or a non-pneumatic tire.

Embodiments according to the present technology are further described below by Examples. However, the scope of the present technology is not limited to these Examples.

EXAMPLES

For each of Examples 1 to 13, Standard Examples 1 to 6, and Comparative Examples 1 to 18, a rubber composition was prepared according to the formulations listed in Tables 1 to 6 with the compounding agents listed in Table 7 used as common components. The components, except the sulfur and the vulcanization accelerator, were kneaded in a 1.7 L sealed Banbury mixer for minutes, then discharged from the mixer, and cooled at room temperature. This was placed in the 1.7 L sealed Banbury mixer described above, and the sulfur and the vulcanization accelerators were then added and mixed, and thus a rubber composition was prepared. The blended amounts of the compounding agents shown in Table 7 are expressed as values in part by mass in 100 parts by mass of the diene rubbers shown in Tables 1 to 6.

Furthermore, a vulcanized rubber sheet was produced by vulcanizing the obtained rubber composition at 160° C. at 20 minutes in a 15 cm×15 cm×0.2 cm mold. Then, the dynamic visco-elasticity was measured by the following method and used as indicators of wet grip properties and low rolling resistance. A rubber sample for cut and chipping resistance evaluation was produced by subjecting the obtained rubber composition to press vulcanization at a temperature of 160° C. for 20 minutes in a mold having a top surface of 9.5 cm×9.5 cm, a bottom surface of 10.6 cm×10.6 cm, and a height of 3.9 cm. The evaluation was performed by the following method.

Wet Grip Properties

Using a viscoelastic spectrometer, available from Toyo Seiki Seisaku-sho, Ltd., dynamic visco-elasticity of the vulcanized rubber sheet obtained as described above was measured at an initial strain of 10%, an amplitude of ±2%, and a frequency of 20 Hz, and the tan 6 at 0° C. was determined. The obtained results are shown in the rows of "Wet grip properties" of Tables 1 to 6, expressed as index values with Standard Example 1 being assigned the value of 100 in Table 1, as index values with Standard Example 2 being assigned the value of 100 in Table 2, as index values with Standard Example 3 being assigned the value of 100 in Table 3, as index values with Standard Example 4 being assigned the value of 100 in Table 4, as index values with Standard Example 5 being assigned the value of 100 in Table 5, and as index values with Standard Example 6 being assigned the value of 100 in Table 6. A larger index value indicates superior wet grip properties.

Low Rolling Resistance

Using a viscoelastic spectrometer, available from Toyo Seiki Seisaku-sho, Ltd., dynamic visco-elasticity of the vulcanized rubber sheet obtained as described above was measured at an initial strain of 10%, an amplitude of ±2%, and a frequency of 20 Hz, and the tan 6 at 60° C. was determined. The obtained results are shown in the rows of "Low rolling resistance" of Tables 1 to 6, expressed as index values with Standard Example 1 being assigned the value of 100 in Table 1, as index values with Standard Example 2 being assigned the value of 100 in Table 2, as index values with Standard Example 3 being assigned the value of 100 in Table 3, as index values with Standard Example 4 being assigned the value of 100 in Table 4, as index values with Standard Example 5 being assigned the value of 100 in Table 5, and as index values with Standard Example 6 being assigned the value of 100 in Table 6. A smaller index value indicates smaller rolling resistance and superior low rolling resistance.

Cut and Chipping Resistance

For the rubber sample for cut and chipping resistance evaluation obtained as described above, a needle (tip angle 90°, diameter 4 mmφ)) with a load of 49 N was dropped from a height of 15 cm onto the rubber sample, and the depth of needle penetration was measured. A smaller depth of needle penetration indicates higher cut resistance and thus is preferred. For each of the obtained results, reciprocal of the depth of needle penetration was calculated, and the results are shown in the rows of "Cut and chipping resistance" of Tables 1 to 6, expressed as index values with Standard Example 1 being assigned the value of 100 in Table 1, as index values with Standard Example 2 being assigned the value of 100 in Table 2, as index values with Standard Example 3 being assigned the value of 100 in Table 3, as index values with Standard Example 4 being assigned the value of 100 in Table 4, as index values with Standard Example 5 being assigned the value of 100 in Table 5, and as index values with Standard Example 6 being assigned the value of 100 in Table 6. A larger index value indicates a smaller depth of needle penetration and superior cut and chipping resistance.

TABLE 1-1

| | | Standard Example 1 | Comparative Example 1 | Comparative Example 2 |
|---|---|---|---|---|
| NR | Parts by mass | | | |
| SBR-1 | Parts by mass | 80 | 80 | 80 |
| SBR-2 | Parts by mass | | | |
| BR | Parts by mass | 20 | 20 | 20 |
| Carbon black | Parts by mass | 70 | 70 | 70 |
| Silica | Parts by mass | | | |
| Aromatic modified terpene resin | Parts by mass | 10 | | 5 |
| Unhydrogenated styrene resin | Parts by mass | | 10 | 5 |
| Hydrogenated styrene resin-1 | Parts by mass | | | |
| Hydrogenated styrene resin-2 | Parts by mass | | | |
| Hydrogenated styrene resin-3 | Parts by mass | | | |
| Silane coupling agent | Parts by mass | | | |
| Tg of diene rubber | ° C. | −43.6 | −43.6 | −43.6 |
| Wet grip properties | Index value | 100 | 98 | 97 |
| Low rolling resistance | Index value | 100 | 103 | 102 |
| Cut and chipping resistance | Index value | 100 | 97 | 98 |

TABLE 1-2

| | | Comparative Example 3 | Example 1 | Example 2 | Example 3 |
|---|---|---|---|---|---|
| NR | Parts by mass | | | | |
| SBR-1 | Parts by mass | 80 | 80 | 80 | 80 |
| SBR-2 | Parts by mass | | | | |
| BR | Parts by mass | 20 | 20 | 20 | 20 |
| Carbon black | Parts by mass | 70 | 70 | 70 | 70 |
| Silica | Parts by mass | | | | |
| Aromatic modified terpene resin | Parts by mass | | 5 | 5 | 5 |
| Unhydrogenated styrene resin | Parts by mass | | | | |
| Hydrogenated styrene resin-1 | Parts by mass | 10 | 5 | | |
| Hydrogenated styrene resin-2 | Parts by mass | | | 5 | |
| Hydrogenated styrene resin-3 | Parts by mass | | | | 5 |
| Silane coupling agent | Parts by mass | | | | |
| Tg of diene rubber | ° C. | −43.6 | −43.6 | −43.6 | −43.6 |
| Wet grip properties | Index value | 102 | 102 | 102 | 100 |
| Low rolling resistance | Index value | 98 | 98 | 100 | 100 |
| Cut and chipping resistance | Index value | 99 | 103 | 100 | 105 |

TABLE 2-1

| | | Standard Example 2 | Comparative Example 4 | Comparative Example 5 |
|---|---|---|---|---|
| NR | Parts by mass | 60 | 60 | 60 |
| SBR-1 | Parts by mass | | | |
| SBR-2 | Parts by mass | | | |
| BR | Parts by mass | 40 | 40 | 40 |
| Carbon black | Parts by mass | 70 | 70 | 70 |
| Silica | Parts by mass | | | |
| Aromatic modified terpene resin | Parts by mass | 10 | | 5 |
| Unhydrogenated styrene resin | Parts by mass | | 10 | 5 |
| Hydrogenated styrene resin-1 | Parts by mass | | | |
| Hydrogenated styrene resin-2 | Parts by mass | | | |
| Hydrogenated styrene resin-3 | Parts by mass | | | |
| Silane coupling agent | Parts by mass | | | |
| Tg of diene rubber | ° C. | −81.4 | −81.4 | −81.4 |
| Wet grip properties | Index value | 100 | 97 | 98 |
| Low rolling resistance | Index value | 100 | 101 | 101 |
| Cut and chipping resistance | Index value | 100 | 98 | 99 |

TABLE 2-2

| | | Comparative Example 6 | Example 4 | Example 5 |
|---|---|---|---|---|
| NR | Parts by mass | 60 | 60 | 60 |

TABLE 2-2-continued

| | | Comparative Example 6 | Example 4 | Example 5 |
|---|---|---|---|---|
| SBR-1 | Parts by mass | | | |
| SBR-2 | Parts by mass | | | |
| BR | Parts by mass | 40 | 40 | 40 |
| Carbon black | Parts by mass | 70 | 70 | 5 |
| Silica | Parts by mass | | | 65 |
| Aromatic modified terpene resin | Parts by mass | | 5 | 5 |
| Unhydrogenated styrene resin | Parts by mass | | | |
| Hydrogenated styrene resin-1 | Parts by mass | 10 | 5 | 5 |
| Hydrogenated styrene resin-2 | Parts by mass | | | |
| Hydrogenated styrene resin-3 | Parts by mass | | | |
| Silane coupling agent | Parts by mass | | | 6.5 |
| Tg of diene rubber | ° C. | −81.4 | −81.4 | −81.4 |
| Wet grip properties | Index value | 101 | 101 | 102 |
| Low rolling resistance | Index value | 98 | 98 | 98 |
| Cut and chipping resistance | Index value | 99 | 102 | 101 |

TABLE 3-2

| | | Comparative Example 9 | Example 6 | Example 7 |
|---|---|---|---|---|
| NR | Parts by mass | | | |
| SBR-1 | Parts by mass | 65 | 65 | 65 |
| SBR-2 | Parts by mass | | | |
| BR | Parts by mass | 35 | 35 | 35 |
| Carbon black | Parts by mass | 100 | 100 | 5 |
| Silica | Parts by mass | | | 95 |
| Aromatic modified terpene resin | Parts by mass | | 5 | 5 |
| Unhydrogenated styrene resin | Parts by mass | | | |
| Hydrogenated styrene resin-1 | Parts by mass | 10 | 5 | 5 |
| Hydrogenated styrene resin-2 | Parts by mass | | | |
| Hydrogenated styrene resin-3 | Parts by mass | | | |
| Silane coupling agent | Parts by mass | | | 9.5 |
| Tg of diene rubber | ° C. | −55.3 | −55.3 | −55.3 |
| Wet grip properties | Index value | 101 | 101 | 102 |
| Low rolling resistance | Index value | 98 | 98 | 96 |
| Cut and chipping resistance | Index value | 98 | 104 | 103 |

TABLE 3-1

| | | Standard Example 3 | Comparative Example 7 | Comparative Example 8 |
|---|---|---|---|---|
| NR | Parts by mass | | | |
| SBR-1 | Parts by mass | 65 | 65 | 65 |
| SBR-2 | Parts by mass | | | |
| BR | Parts by mass | 35 | 35 | 35 |
| Carbon black | Parts by mass | 100 | 100 | 100 |
| Silica | Parts by mass | | | |
| Aromatic modified terpene resin | Parts by mass | 10 | | 5 |
| Unhydrogenated styrene resin | Parts by mass | | 10 | 5 |
| Hydrogenated styrene resin-1 | Parts by mass | | | |
| Hydrogenated styrene resin-2 | Parts by mass | | | |
| Hydrogenated styrene resin-3 | Parts by mass | | | |
| Silane coupling agent | Parts by mass | | | |
| Tg of diene rubber | ° C. | −55.3 | −55.3 | −55.3 |
| Wet grip properties | Index value | 100 | 97 | 98 |
| Low rolling resistance | Index value | 100 | 103 | 102 |
| Cut and chipping resistance | Index value | 100 | 96 | 97 |

TABLE 4-1

| | | Standard Example 4 | Comparative Example 10 | Comparative Example 11 |
|---|---|---|---|---|
| NR | Parts by mass | 10 | 10 | 10 |
| SBR-1 | Parts by mass | | | |
| SBR-2 | Parts by mass | 65 | 65 | 65 |
| BR | Parts by mass | 25 | 25 | 25 |
| Carbon black | Parts by mass | 70 | 70 | 70 |
| Silica | Parts by mass | | | |
| Aromatic modified terpene resin | Parts by mass | 10 | | 5 |
| Unhydrogenated styrene resin | Parts by mass | | 10 | 5 |
| Hydrogenated styrene resin-1 | Parts by mass | | | |
| Hydrogenated styrene resin-2 | Parts by mass | | | |
| Hydrogenated styrene resin-3 | Parts by mass | | | |
| Silane coupling agent | Parts by mass | | | |
| Tg of diene rubber | ° C. | −67.5 | −67.5 | −67.5 |
| Wet grip properties | Index value | 100 | 96 | 97 |
| Low rolling resistance | Index value | 100 | 102 | 101 |
| Cut and chipping resistance | Index value | 100 | 98 | 99 |

TABLE 4-2

| | | Comparative Example 12 | Example 8 | Example 9 |
|---|---|---|---|---|
| NR | Parts by mass | 10 | 10 | 10 |
| SBR-1 | Parts by mass | | | |
| SBR-2 | Parts by mass | 65 | 65 | 65 |
| BR | Parts by mass | 25 | 25 | 25 |
| Carbon black | Parts by mass | 70 | 70 | 5 |
| Silica | Parts by mass | | | 65 |
| Aromatic modified terpene resin | Parts by mass | | 5 | |
| Unhydrogenated styrene resin | Parts by mass | | | |
| Hydrogenated styrene resin-1 | Parts by mass | 10 | 5 | 10 |
| Hydrogenated styrene resin-2 | Parts by mass | | | |
| Hydrogenated styrene resin-3 | Parts by mass | | | |
| Silane coupling agent | Parts by mass | | | 6.5 |
| Tg of diene rubber | ° C. | −67.5 | −67.5 | −67.5 |
| Wet grip properties | Index value | 102 | 102 | 103 |
| Low rolling resistance | Index value | 97 | 97 | 96 |
| Cut and chipping resistance | Index value | 99 | 104 | 103 |

TABLE 5-2

| | | Comparative Example 15 | Example 10 | Example 11 |
|---|---|---|---|---|
| NR | Parts by mass | | | |
| SBR-1 | Parts by mass | 90 | 90 | 90 |
| SBR-2 | Parts by mass | | | |
| BR | Parts by mass | 10 | 10 | 10 |
| Carbon black | Parts by mass | 100 | 100 | 5 |
| Silica | Parts by mass | | | 95 |
| Aromatic modified terpene resin | Parts by mass | | 5 | 5 |
| Unhydrogenated styrene resin | Parts by mass | | | |
| Hydrogenated styrene resin-1 | Parts by mass | 10 | 5 | 5 |
| Hydrogenated styrene resin-2 | Parts by mass | | | |
| Hydrogenated styrene resin-3 | Parts by mass | | | |
| Silane coupling agent | Parts by mass | | | 9.5 |
| Tg of diene rubber | ° C. | −35.8 | −35.8 | −35.8 |
| Wet grip properties | Index value | 101 | 101 | 103 |
| Low rolling resistance | Index value | 99 | 99 | 98 |
| Cut and chipping resistance | Index value | 97 | 102 | 101 |

TABLE 5-1

| | | Standard Example 5 | Comparative Example 13 | Comparative Example 14 |
|---|---|---|---|---|
| NR | Parts by mass | | | |
| SBR-1 | Parts by mass | 90 | 90 | 90 |
| SBR-2 | Parts by mass | | | |
| BR | Parts by mass | 10 | 10 | 10 |
| Carbon black | Parts by mass | 100 | 100 | 100 |
| Silica | Parts by mass | | | |
| Aromatic modified terpene resin | Parts by mass | 10 | | 5 |
| Unhydrogenated styrene resin | Parts by mass | | 10 | 5 |
| Hydrogenated styrene resin-1 | Parts by mass | | | |
| Hydrogenated styrene resin-2 | Parts by mass | | | |
| Hydrogenated styrene resin-3 | Parts by mass | | | |
| Silane coupling agent | Parts by mass | | | |
| Tg of diene rubber | ° C. | −35.8 | −35.8 | −35.8 |
| Wet grip properties | Index value | 100 | 97 | 98 |
| Low rolling resistance | Index value | 100 | 102 | 101 |
| Cut and chipping resistance | Index value | 100 | 95 | 96 |

TABLE 6-1

| | | Standard Example 6 | Comparative Example 16 | Comparative Example 17 |
|---|---|---|---|---|
| NR | Parts by mass | | | |
| SBR-1 | Parts by mass | 90 | 90 | 90 |
| SBR-2 | Parts by mass | | | |
| BR | Parts by mass | 10 | 10 | 10 |
| Carbon black | Parts by mass | 70 | 70 | 70 |
| Silica | Parts by mass | | | |
| Aromatic modified terpene resin | Parts by mass | 10 | | 5 |
| Unhydrogenated styrene resin | Parts by mass | | 10 | 5 |
| Hydrogenated styrene resin-1 | Parts by mass | | | |
| Hydrogenated styrene resin-2 | Parts by mass | | | |
| Hydrogenated styrene resin-3 | Parts by mass | | | |
| Silane coupling agent | Parts by mass | | | |
| Tg of diene rubber | ° C. | −35.8 | −35.8 | −35.8 |
| Wet grip properties | Index value | 100 | 97 | 98 |
| Low rolling resistance | Index value | 100 | 102 | 101 |
| Cut and chipping resistance | Index value | 100 | 95 | 96 |

TABLE 6-2

| | | Comparative Example 18 | Example 12 | Example 13 |
|---|---|---|---|---|
| NR | Parts by mass | | | |
| SBR-1 | Parts by mass | 90 | 90 | 90 |
| SBR-2 | Parts by mass | | | |
| BR | Parts by mass | 10 | 10 | 10 |
| Carbon black | Parts by mass | 70 | 70 | 5 |
| Silica | Parts by mass | | | 65 |
| Aromatic modified terpene resin | Parts by mass | | 5 | 5 |
| Unhydrogenated styrene resin | Parts by mass | | | |
| Hydrogenated styrene resin-1 | Parts by mass | 10 | 5 | 5 |
| Hydrogenated styrene resin-2 | Parts by mass | | | |
| Hydrogenated styrene resin-3 | Parts by mass | | | |
| Silane coupling agent | Parts by mass | | | 6.5 |
| Tg of diene rubber | ° C. | −35.8 | −35.8 | −35.8 |
| Wet grip properties | Index value | 101 | 101 | 102 |
| Low rolling resistance | Index value | 99 | 99 | 98 |
| Cut and chipping resistance | Index value | 97 | 102 | 101 |

For Tables 1 to 6, the types of used raw materials are as follows.

NR: Natural rubber, SIR-20; glass transition temperature: −65° C.

SB R-1: Styrene-butadiene rubber, TUFDENE E581, available from Asahi Kasei Corporation; glass transition temperature: −28° C.

SBR-2: Styrene-butadiene rubber, Nipol 1723, available from Zeon Corporation; glass transition temperature: −53° C.

BR: Butadiene rubber, UBEPOL 1220, available from Ube Industries, Ltd.; glass transition temperature: −106° C.

Carbon black: Niteron #300 IH, available from NIPPON STEEL Carbon Co., Ltd.

Silica: ZEOSIL 1165MP, available from Solvay

Silane coupling agent: Si69, available from Evonik Degussa, bis(triethoxysilylpropyl)tetrasulfide Aromatic modified terpene resin: TO-125, available from Yasuhara Chemical Co., Ltd.; softening point: 125° C.

Unhydrogenated styrene resin: Styrene resin, YS resin SX100, available from Yasuhara Chemical Co., Ltd.; softening point: 100° C.

Hydrogenated styrene resin-1: Hydrogenated styrene resin with hydrogenation percentage of 70%; softening temperature: 101° C.

Hydrogenated styrene resin-2: Hydrogenated styrene resin with hydrogenation percentage of 30%; softening temperature: 95° C.

Hydrogenated styrene resin-3: Hydrogenated styrene resin with hydrogenation percentage of 95%; softening temperature: 116° C.

Preparation of Hydrogenated Styrene Resin-1

In a flask, 500 g of toluene and 15 g of aluminum chloride catalyst were charged and stirred under a nitrogen stream, and 500 g of styrene was added dropwise over 1 hour. During this time, the temperature in the flask was maintained at 20° C. After completion of the dropwise addition, the catalyst was removed by washing, the obtained reaction oil was distilled under reduced pressure to remove the toluene, and thus 500 g of styrene resin was obtained. The weight average molecular weight was 2500, and the softening point was 101° C.

In an autoclave, 500 g of the obtained styrene resin, 1000 g of cyclohexane, and 10 g of powder stabilized nickel catalyst were placed. The autoclave was then sealed, and after the atmosphere was purged with a nitrogen gas, hydrogen gas was introduced to the autoclave. The mixture was heated while being stirred, and when the temperature reached 150° C., the pressure of hydrogen was set to 50 kg/cm 2. While the pressure was maintained at 50 kg/cm 2 by supplementing absorbed hydrogen, reaction was performed for 6 hours. After the reaction, the catalyst was filtered, the solvent was distilled off under reduced pressure, and thus a hydrogenated styrene resin was obtained. The softening point was 101° C., the hydrogenation percentage of aromatic ring was 70%.

Preparation of Hydrogenated Styrene Resin-2

The hydrogenation reaction was performed for 3 hours in the same manner as for the hydrogenated styrene resin-1. The softening point was 101° C., the hydrogenation percentage of aromatic ring was 30%.

Preparation of Hydrogenated Styrene Resin-3

The hydrogenation reaction was performed for 8 hours in the same manner as for the hydrogenated styrene resin-1. The softening point was 116° C., the hydrogenation percentage of aromatic ring was 95%.

TABLE 7

| Common formulation of rubber compositions | |
|---|---|
| Aroma oil | 10.0 parts by mass |
| Processing aid | 1.0 part by mass |
| Anti-aging agent | 3.0 parts by mass |
| Wax | 1.0 part by mass |
| Zinc oxide | 2.5 parts by mass |
| Stearic acid | 2.0 parts by mass |
| Vulcanization accelerator-1 | 2.0 parts by mass |
| Vulcanization accelerator-2 | 0.5 parts by mass |
| Sulfur | 2.0 parts by mass |

For Table 7, the types of the used raw materials are as follows.

Aroma oil: Extract No. 4S, available from Showa Shell Sekiyu K. K.

Processing aid: HT207, available from Struktol Corp.

Anti-aging agent: 6PPD available from Flexsys

Wax: OZOACE-0015A, available from Nippon Seiro Co., Ltd.

Zinc oxide: Zinc Oxide III, available from Seido Chemical Industry Co., Ltd.

Stearic acid: beads stearic acid, available from NOF Corporation

Vulcanization accelerator-1: NOCCELER CZ-G, available from Ouchi Shinko Chemical Industrial Co., Ltd.

Vulcanization accelerator-2: Soxinol D-G, available from Sumitomo Chemical Co., Ltd.

Sulfur: Golden Flower oil treated sulfur powder, available from Tsurumi Chemical Industry Co., Ltd.

As can be seen from Table 1, it was confirmed that the rubber compositions of Examples 1 to 3 had excellent wet grip properties, low rolling resistance, and cut and chipping resistance.

The rubber composition of Comparative Example 1 contained only the unhydrogenated styrene resin in place of the aromatic modified terpene resin of Standard Example 1; and, wet grip properties, low rolling resistance, and cut and chipping resistance were deteriorated.

The rubber composition of Comparative Example 2 contained a combination of the aromatic modified terpene resin and the unhydrogenated styrene resin; and, wet grip properties, low rolling resistance, and cut and chipping resistance were deteriorated.

The rubber composition of Comparative Example 3 contained only the hydrogenated styrene resin in place of the aromatic modified terpene resin of Standard Example 1; and, cut and chipping resistance was deteriorated.

As can be seen from Table 2, it was confirmed that the rubber compositions of Examples 4 and 5 that were suitable for studless tires and studded tires had excellent wet grip properties, low rolling resistance, and cut and chipping resistance.

The rubber composition of Comparative Example 4 contained only the unhydrogenated styrene resin in place of the aromatic modified terpene resin of Standard Example 2; and, wet grip properties, low rolling resistance, and cut and chipping resistance were deteriorated.

The rubber composition of Comparative Example 5 contained a combination of the aromatic modified terpene resin and the unhydrogenated styrene resin; and, wet grip properties, low rolling resistance, and cut and chipping resistance were deteriorated.

The rubber composition of Comparative Example 6 contained only the hydrogenated styrene resin in place of the aromatic modified terpene resin of Standard Example 2; and, cut and chipping resistance was deteriorated.

As can be seen from Table 3, it was confirmed that the rubber compositions of Examples 6 and 7 that were suitable for winter tires had excellent wet grip properties, low rolling resistance, and cut and chipping resistance.

The rubber composition of Comparative Example 7 contained only the unhydrogenated styrene resin in place of the aromatic modified terpene resin of Standard Example 3; and, wet grip properties, low rolling resistance, and cut and chipping resistance were deteriorated.

The rubber composition of Comparative Example 8 contained a combination of the aromatic modified terpene resin and the unhydrogenated styrene resin; and, wet grip properties, low rolling resistance, and cut and chipping resistance were deteriorated.

The rubber composition of Comparative Example 9 contained only the hydrogenated styrene resin in place of the aromatic modified terpene resin of Standard Example 3; and, cut and chipping resistance was deteriorated.

As can be seen from Table 4, it was confirmed that the rubber compositions of Examples 8 and 9 that were suitable for all-season tires had excellent wet grip properties, low rolling resistance, and cut and chipping resistance.

The rubber composition of Comparative Example 10 contained only the unhydrogenated styrene resin in place of the aromatic modified terpene resin of Standard Example 4; and, wet grip properties, low rolling resistance, and cut and chipping resistance were deteriorated.

The rubber composition of Comparative Example 11 contained a combination of the aromatic modified terpene resin and the unhydrogenated styrene resin; and, wet grip properties, low rolling resistance, and cut and chipping resistance were deteriorated.

The rubber composition of Comparative Example 12 contained only the hydrogenated styrene resin in place of the aromatic modified terpene resin of Standard Example 4; and, cut and chipping resistance was deteriorated.

As can be seen from Table 5, it was confirmed that the rubber compositions of Examples 10 and 11 that were suitable for high-performance tires and racing tires had excellent wet grip properties, low rolling resistance, and cut and chipping resistance.

The rubber composition of Comparative Example 13 contained only the unhydrogenated styrene resin in place of the aromatic modified terpene resin of Standard Example 5; and, wet grip properties, low rolling resistance, and cut and chipping resistance were deteriorated.

The rubber composition of Comparative Example 14 contained a combination of the aromatic modified terpene resin and the unhydrogenated styrene resin; and, wet grip properties, low rolling resistance, and cut and chipping resistance were deteriorated.

The rubber composition of Comparative Example 15 contained only the hydrogenated styrene resin in place of the aromatic modified terpene resin of Standard Example 5; and, cut and chipping resistance was deteriorated.

As can be seen from Table 6, it was confirmed that the rubber compositions of Examples 12 and 13 that were suitable for fuel efficient tires had excellent wet grip properties, low rolling resistance, and cut and chipping resistance.

The rubber composition of Comparative Example 16 contained only the unhydrogenated styrene resin in place of the aromatic modified terpene resin of Standard Example 6; and, wet grip properties, low rolling resistance, and cut and chipping resistance were deteriorated.

The rubber composition of Comparative Example 17 contained a combination of the aromatic modified terpene resin and the unhydrogenated styrene resin; and, wet grip properties, low rolling resistance, and cut and chipping resistance were deteriorated.

The rubber composition of Comparative Example 18 contained only the hydrogenated styrene resin in place of the aromatic modified terpene resin of Standard Example 6; and, cut and chipping resistance was deteriorated.

The invention claimed is:

1. A rubber composition comprising from 1 to 150 parts by mass of a mixed resin in 100 parts by mass of a diene rubber, the mixed resin containing from 1 to 99 mass % of a hydrogenated styrene resin and from 99 to 1 mass % of an aromatic modified terpene resin, wherein the hydrogenated styrene resin is obtained by subjecting a styrene resin, which consists solely of styrene monomer, to hydrogenation.

2. The rubber composition according to claim 1, wherein a hydrogenation percentage of the hydrogenated styrene resin is from 40 to 90%.

3. The rubber composition according to claim 1, comprising from 5 to 300 parts by mass of an inorganic filler in 100 parts by mass of the diene rubber.

4. The rubber composition according to claim 1, wherein the diene rubber contains a natural rubber and a butadiene rubber, and an average glass transition temperature of the diene rubber is from −100° C. to −80° C.

5. The rubber composition according to claim 1, comprising from 10 to 90 parts by mass of silica in 100 parts by mass of the diene rubber.

6. The rubber composition according to claim 1, wherein the diene rubber contains a styrene-butadiene rubber and a butadiene rubber, and an average glass transition temperature of the diene rubber is from −100° C. to −50° C.

7. The rubber composition according to claim 1, comprising from 90 to 180 parts by mass of silica in 100 parts by mass of the diene rubber.

8. The rubber composition according to claim 1, wherein the diene rubber contains a styrene-butadiene rubber, and an average glass transition temperature of the diene rubber is from −80° C. to −20° C.

9. The rubber composition according to claim 8, comprising from 10 to 90 parts by mass of silica in 100 parts by mass of the diene rubber.

10. The rubber composition according to claim 1, wherein the diene rubber contains a styrene-butadiene rubber, and an average glass transition temperature of the diene rubber is higher than −50° C. and −20° C. or lower.

11. The rubber composition according to claim 10, comprising from 90 to 180 parts by mass of silica in 100 parts by mass of the diene rubber.

12. The rubber composition according to claim 1, wherein the diene rubber contains a styrene-butadiene rubber, and an average glass transition temperature of the diene rubber is from −40° C. to −20° C.

13. The rubber composition according to claim 12, comprising 10 parts by mass or more and less than 90 parts by mass of silica in 100 parts by mass of the diene rubber.

14. A tire comprising the rubber composition according to claim 1—in a tread portion.

15. A rubber composition comprising from 1 to 150 parts by mass of a mixed resin in 100 parts by mass of a diene rubber, the mixed resin containing from 1 to 99 mass % of a hydrogenated styrene resin and from 99 to 1 mass % of an aromatic modified terpene resin, wherein the diene rubber contains a natural rubber and a butadiene rubber, and an average glass transition temperature of the diene rubber is from −100° C. to −80° C.

16. The rubber composition according to claim 15, wherein a hydrogenation percentage of the hydrogenated styrene resin is from 40 to 90%.

17. The rubber composition according to claim 15, comprising from 10 to 90 parts by mass of silica in 100 parts by mass of the diene rubber.

* * * * *